United States Patent [19]
Fahs et al.

(10) Patent No.: US 7,360,207 B2
(45) Date of Patent: Apr. 15, 2008

(54) METHOD AND SYSTEM TO ANALYZE INLINED FUNCTIONS

(75) Inventors: Brian Fahs, Champaign, IL (US); Robert Hundt, Santa Clara, CA (US); Vinodha Ramasamy, Campbell, CA (US); Tara Krishnaswamy, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 569 days.

(21) Appl. No.: 10/016,949

(22) Filed: Dec. 13, 2001

(65) Prior Publication Data

US 2003/0115581 A1    Jun. 19, 2003

(51) Int. Cl.
*G06F 9/45* (2006.01)

(52) U.S. Cl. .................... 717/158; 717/151; 717/154

(58) Field of Classification Search ................ 717/130, 717/135, 133, 140–167, 128; 714/34, 47; 712/240
See application file for complete search history.

(56) References Cited

U.S. PATENT DOCUMENTS

| | | | | |
|---|---|---|---|---|
| 5,710,724 A * | 1/1998 | Burrows | ...................... | 714/34 |
| 5,740,443 A * | 4/1998 | Carini | ...................... | 717/133 |
| 5,768,500 A * | 6/1998 | Agrawal et al. | ............... | 714/47 |
| 5,797,013 A * | 8/1998 | Mahadevan et al. | ......... | 717/160 |
| 5,850,554 A * | 12/1998 | Carver | ....................... | 717/162 |
| 5,950,003 A * | 9/1999 | Kaneshiro et al. | .......... | 717/130 |
| 5,963,740 A * | 10/1999 | Srivastava et al. | .......... | 717/130 |
| 6,071,317 A * | 6/2000 | Nagel | .......................... | 717/128 |
| 6,145,121 A * | 11/2000 | Levy et al. | .................. | 717/135 |
| 6,233,678 B1 * | 5/2001 | Bala | ........................... | 712/240 |
| 6,332,212 B1 * | 12/2001 | Organ et al. | ................. | 717/128 |
| 6,332,214 B1 * | 12/2001 | Wu | ............................ | 717/141 |
| 6,499,137 B1 * | 12/2002 | Hunt | ........................... | 717/164 |
| 6,971,091 B1 * | 11/2005 | Arnold et al. | ............... | 717/145 |
| 2002/0194580 A1 * | 12/2002 | Ramasamy et al. | ......... | 717/130 |
| 2003/0101439 A1 * | 5/2003 | Desoli et al. | ................ | 717/148 |
| 2004/0019884 A1 * | 1/2004 | Haber et al. | ................. | 717/154 |

OTHER PUBLICATIONS

Hundt, HP Caliper-An Architecture for Performance Analysis Tools, Oct. 2000.*
Sloane, Generating Dynamic Program Analysis Tools, IEEE, 1997.*
Thomas, Poor man's Watchpoints, ACM, Jan. 1995.*
Hundt, HP Caliper: A Framework for performance Analysis Tools, IEEE, 2000.*

* cited by examiner

*Primary Examiner*—Meng-Al T. An
*Assistant Examiner*—Insun Kang

(57) ABSTRACT

A method and a system for examining an inlined function using a performance analysis tool are described. An inlined function is identified in computer code. Upon identification of the inlined function, and for example in response to executing a breakpoint associated with the inlined function, a performance analysis tool is used to perform desired task on the inlined function.

24 Claims, 3 Drawing Sheets

METHOD AND SYSTEM TO ANALYZE INLINED FUNCTIONS

TECHNICAL FIELD

The present claimed invention relates to analysis of a computer program. More specifically, the present claimed invention relates to analyzing of inlined functions.

BACKGROUND ART

Over recent years, the computing community developed a strong set of tools and methods used to analyze and monitor run-time behavior of a program. Performance analysis tools include, for example, basis tools which allow for mapping of periodically taken snapshots during a program's execution to the program's source (e.g. sampling applications) and more complex tools which allow a broader range of program analysis (e.g. code instrumentation applications). Measurements such as basic-block coverage and function invocation counting can be accurately made using code instrumentation. One specific type of code instrumentation is referred to as dynamic binary instrumentation. Dynamic binary instrumentation allows program instructions to be changed on-the-fly. Additionally, dynamic binary instrumentation, as opposed to static instrumentation, is performed at run-time of a program and only instruments those parts of an executable that are actually executed. This minimizes the overhead imposed by the instrumentation process itself. Furthermore, performance analysis tools based on dynamic binary instrumentation require no special preparation of an executable such as, for example, a modified build or link process.

Unfortunately the benefits of conventional performance analysis tools are not available to all types of programs and functions. Specifically, conventional performance analysis tools will not work properly with inlined functions. As an explanation, many programming languages offer support for "inlining" functions. That is, many programming languages such as, for example, C++, allow the compiler to generate machine code for a function call such that the code from the function body gets directly inserted into the place where the call was made. The now inlined function causes the size of the text program to increase but removes the overhead of the function call. From the point of view of the programmer, there is some ambiguity as to whether a particular function has been inlined or not. For example, even if the programmer specifies in the source code that a certain function be inlined, that does not necessarily mean that the particular function will ultimately be inlined in the binary executable by the compiler. This ambiguity exists because there are certain cases where the compiler decides, on its own, not to inline a function even though the programmer has specified for the function to be inlined. Because conventional performance analysis tools correlate to the binary executable and the regular functions therein as opposed to the source code, and because conventional performance analysis tools do not take into account inlined function information, inlined functions can not be properly analyzed using existing performance analysis tools.

Thus, a need has arisen for a method and system for examining an inlined function using a performance analysis tool.

SUMMARY OF THE INVENTION

The present invention provides a method and system for examining an inlined function using a performance analysis tool.

Specifically, in one embodiment, an inlined function in computer code is identified. Upon identification of the inlined function, in response for example to executing a breakpoint associated with the inlined function, a performance analysis tool is used to perform a desired task on the inlined function.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODES FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying", "creating", "using", "performing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Invention

Figure 1:
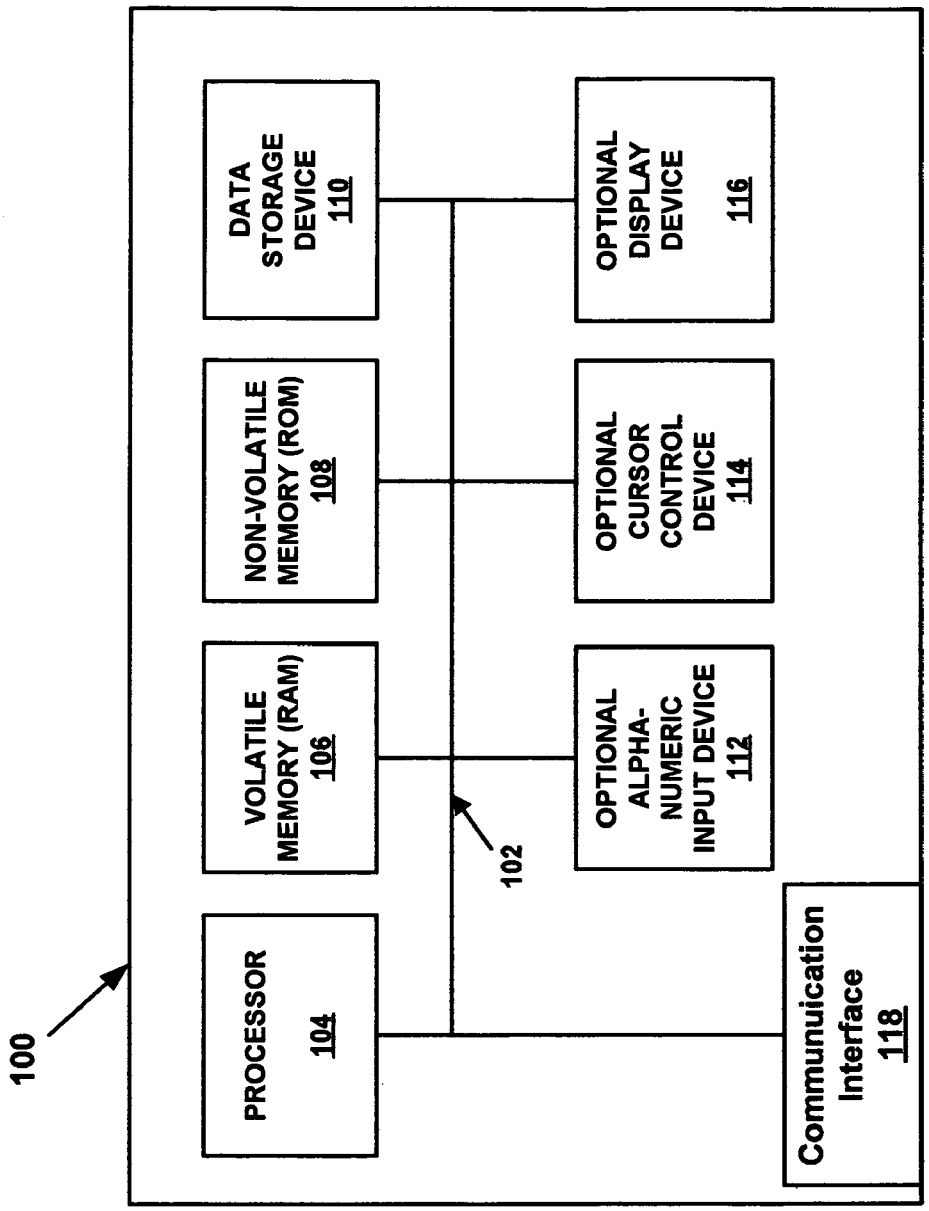
FIG. 1 is a schematic diagram of an exemplary computer system used to perform steps of the present method in accordance with various embodiments of the present claimed invention.

With reference now to FIG. 1, portions of the present method and system are comprised of computer-readable and computer-executable instructions which reside, for example, in computer-usable media of a computer system. FIG. 1 illustrates an exemplary computer system 100 used in accordance with one embodiment of the present invention. It is appreciated that system 100 of FIG. 1 is exemplary only and that the present invention can operate on or within a number of different computer systems including general purpose networked computer systems, embedded computer systems, routers, switches, server devices, client devices, various intermediate devices/nodes, stand alone computer systems, and the like. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity. Additionally, portions of the present embodiment are well suited to operating in conjunction with various mobile clients such as, for example, a cell phone, personal digital assistant (PDA), laptop computer, pager, and the like.

System 100 of FIG. 1 includes an address/data bus 102 for communicating information, and a central processor unit 104 coupled to bus 102 for processing information and instructions. As an example, central processor unit 104 may be an IA-64 microprocessor architecture by Intel Corporation of Santa Clara, Calif. System 100 also includes data storage features such as a computer usable volatile memory 106, e.g. random access memory (RAM), coupled to bus 102 for storing information and instructions for central processor unit 104. System 100 also includes computer usable non-volatile memory 108, e.g. read only memory (ROM), coupled to bus 102 for storing static information and instructions for the central processor unit 104. Such static information is comprised, in one embodiment, of commands for configuration and initial operations of computer system 100. Computer system 100 also includes a data storage unit 110 (e.g., a magnetic or optical disk and disk drive) coupled to bus 102 for storing information and instructions.

System 100 of the present invention also includes an optional alphanumeric input device 112 including alphanumeric and function keys coupled to bus 102 for communicating information and command selections to central processor unit 104. System 100 also optionally includes an optional cursor control device 114 coupled to bus 102 for communicating user input information and command selections to central processor unit 104. System 100 of the present embodiment also includes an optional display device 116 coupled to bus 102 for displaying information. System 100 of the present embodiment also includes a communication interface 118 which enables computer system 100 to interface with other computers or devices. In one embodiment, communication 118 is, for example, a modem, an integrated services digital network (ISDN) card or the like, a local area network (LAN) port, etc. Those skilled in the art will recognize that modems or various types of network interface cards (NICs) typically provide data communications via telephone lines, while a LAN port provides data communications via a LAN. Communication interface 118 of computer system 100 may also enable wireless communications. Furthermore, communication interface 118 may enable communication with other computers or devices through one or more networks. For example, computer system 100, using communication interface 118, may communicate to the "Internet."

Computer system 100 may be used to implement the techniques described below. In various embodiments, processor 104 performs the steps of the techniques by executing instructions brought to RAM 106. In alternative embodiments, hard-wired circuitry may be used in place of or in combination with software instructions to implement the described techniques. Consequently, embodiments of the invention are not limited to any one or a combination of software, hardware, or circuitry.

Instructions executed by processor 104 may be stored in and carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic, or light waves, etc. As an example, the instructions to be executed by processor 104 are in the form of one or more software programs and are initially stored in a CD-ROM being interfaced with computer system 100. Computer system 100 loads these instructions in RAM 106, executes some instructions, and sends some instructions via communication interface 118, a modem, and a telephone line to a network, the Internet, etc. A remote computer, receiving data through a network cable, executes the received instructions and sends the data to computer system 100 to be stored in storage device 110.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the present invention is found below.

General Method and System for Analyzing and Inlined Function

Figure 2:
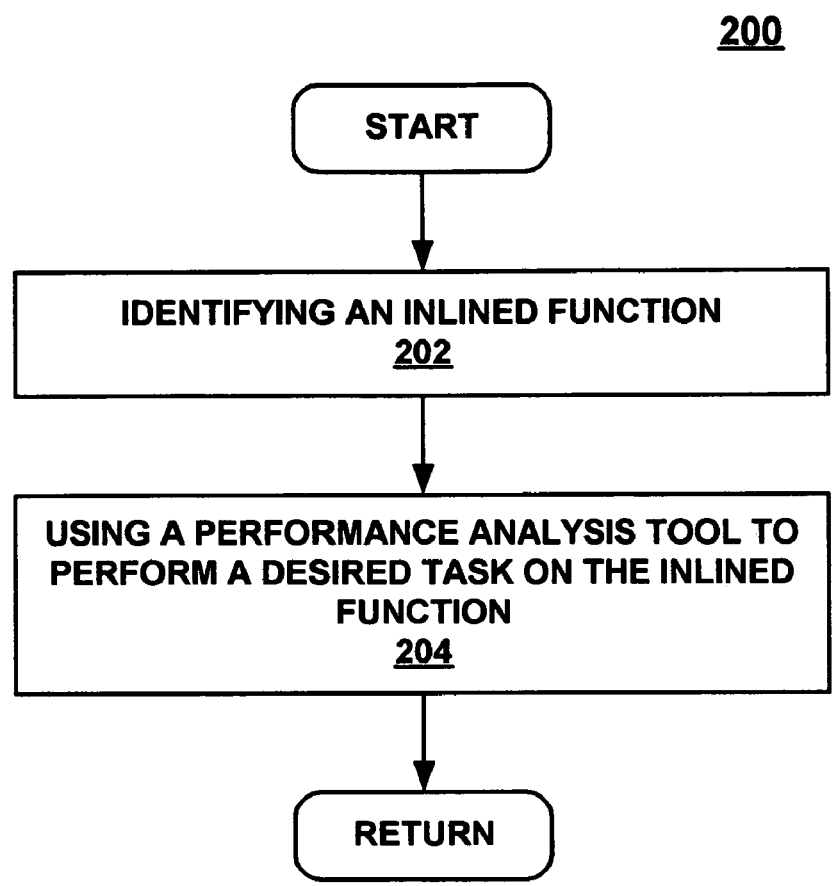
FIG. 2 is a flow chart of steps performed to analyze an inlined function in accordance with one embodiment of the present claimed invention.

With reference next to flow chart 200 of FIG. 2 and to FIG. 1, exemplary steps used by the various embodiments of present invention are illustrated. Flow chart 200 includes processes of the present invention which, in one embodiment, are carried out by a processor under the control of computer-readable and computer-executable instructions. The computer-readable and computer-executable instructions reside, for example, in data storage features such as computer usable volatile memory 106, computer usable non-volatile memory 108, and/or data storage device 110 of FIG. 1. In one embodiment, the computer-readable and computer-executable instructions are used to control or operate in conjunction with, for example, processor 104 of FIG. 1.

With reference again to FIG. 2, steps performed in accordance with one embodiment of the present invention are shown. Although specific steps are disclosed in flow chart 200 of FIG. 2, such steps are exemplary. That is, the present invention is well suited to performing various other steps or variations of the steps recited in FIG. 2. At step 202, the present embodiment identifies an inlined function. In one embodiment (e.g. a C++ application environment), the present embodiment browses through the debug information present in the target application and obtains location information for the inlined function. Specifically, in this embodiment, the present invention obtains and reads the source correlation information contained within the executable. The present embodiment uses the source correlation information to obtain the start and end addresses for the inlined function. The example set forth herein has and will continue to refer to an inline function (i.e. one inlined function). It should be understood, however, that such an example is for purposes of illustration only, and that the present invention is also well suited to an embodiment in which the present invention performs the steps of the present example for a plurality of inlined functions.

Referring now to step 204, the present embodiment then uses a performance analysis tool to perform a desired task on the inlined function. More specifically, in one embodiment, using the start address obtained at step 202 for the inlined function, the present invention inserts a breakpoint or other control transfer instruction at the start of the inlined function. Additional details related to instrumentation including discussion of features such as breakpoints can be found in co-owned, commonly-assigned U.S. patent application Ser. No. 09/833,248 filed Apr. 11, 2001, entitled "Dynamic Instrumentation Of An Executable Program", to Hundt et al. which is incorporated herein by reference as background material. When the breakpoint associated with an inlined function is executed, the present embodiment will perform the desired task on the inlined function.

With reference still to step 204, in one embodiment, when the breakpoint associated with an inlined function is executed, the present embodiment will perform an instrumentation task on the inlined function. In such an embodiment, an instrumenting application is used to perform the instrumentation task. In one approach, the instrumenting application is comprised of the Caliper application by Hewlett-Packard Company of Palo Alto, Calif. The present invention is, however, well suited to use with various other instrumenting applications. In one such embodiment, the instrumenting application will perform the desired instrumentation task (e.g. incrementing a function count), restore the original instructions, if necessary and then continue execution.

With reference still to step 204, in one embodiment when an inserted breakpoint is hit, the instrumenting application will relocate the instrumented function to shared memory and replace the function entry with a long branch to shared memory or memory of the target process. In such an approach, the instrumenting application inserts code into the relocated instrumented function to, for example, increment counters placed at the start of each inlined function. Additionally, another approach besides relocating the instrumented function is replacing the original starting bundle of each inlined function with a long branch to a shared memory probe code sequence that will first save the necessary registers, execute the original bundle, and increment a variable (or perform some other task), restore the registers and then jump back to the original function.

With reference still to step 204, the present invention is also well suited to an embodiment in which the performance analysis task is comprised, for example, of a task other than an instrumentation task. As an example, in one embodiment, the present invention performs a mapping of samples to the inlined function. That is, the performance analysis tool is comprised of a sampling application which maps samples to the inlined function located at step 202. Also, in one embodiment, processor 104 of FIG. 1 in conjunction with instructions, residing, for example, in RAM 106, ROM 108, and/or data storage device 110, comprise an apparatus which operates to perform steps 202 and 204.

Figure 3:
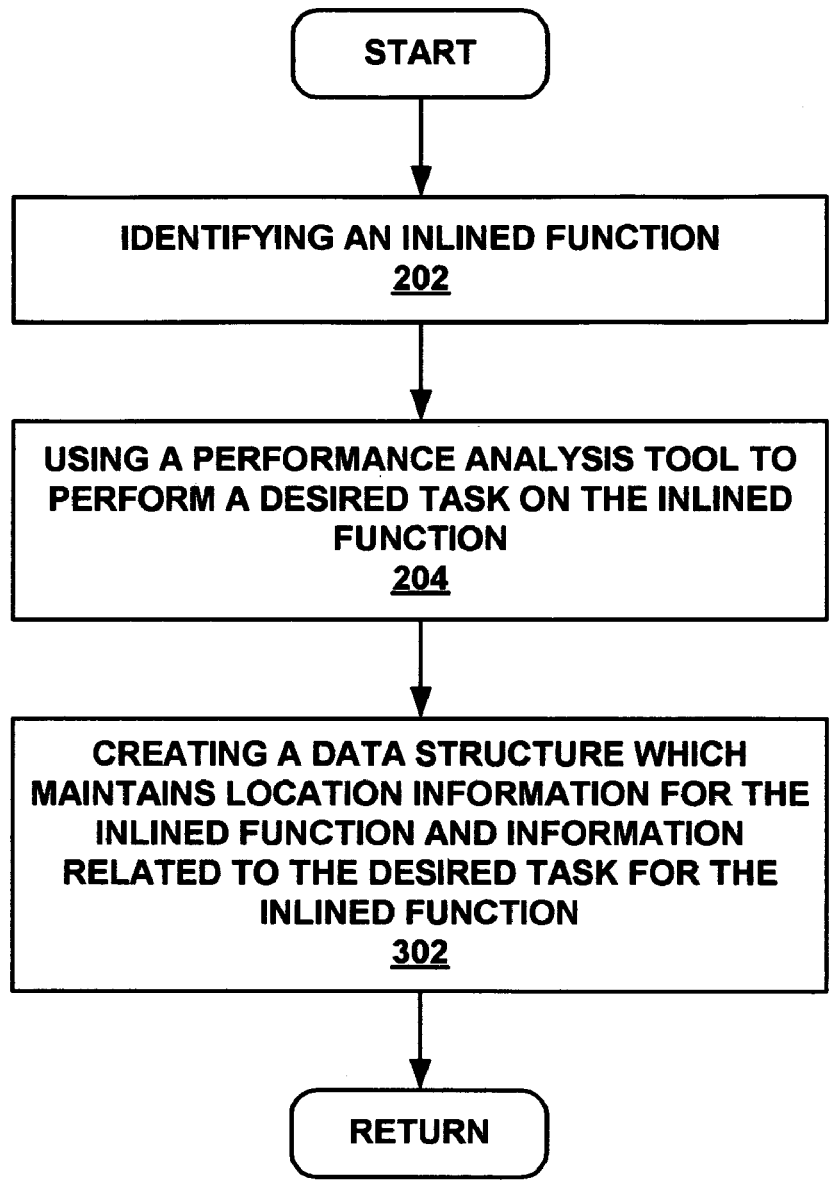
FIG. 3 is a flow chart of steps performed to analyze an inlined function including the step of creating a data structure in accordance with one embodiment of the present claimed invention.

With reference now to FIG. 3, a flow chart 300 of steps performed in accordance with another embodiment of the present invention is shown. The method of the present embodiment includes steps 202 and 204 of FIG. 2. These steps were described above in detail in conjunction with the description of FIG. 2, and are not repeated herein for purposes of brevity and clarity. The method of the present embodiment as described in FIG. 3 also includes new step 302. At step 302, the present embodiment, creates a data structure which maintains location information for the inlined function and information related to the desired task for the inlined function. In one such approach, the data structure resides, for example, in shared memory, maintains the start and end addresses for the inlined function, and also stores information regarding the desired task to be performed on the inlined function. Information regarding the task to be performed on the inlined function includes, for example, the specific performance analysis task to be performed, results of the performance analysis task, and the like. In one embodiment, processor 104 of FIG. 1 in conjunction with instructions, residing, for example, in RAM 106, ROM 108, and/or data storage device 110, comprise an apparatus which operates to perform step 302.

Thus, the present invention provides a method and system for examining an inlined function using a performance analysis tool.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A computer-implemented method for examining an inlined function using a performance analysis tool, said method comprising:

identifying an inlined function in source code by using source correlation information contained within a binary executable of the source code, wherein said source code is processed for binary executable;

inserting a breakpoint at the start of said inlined function in said binary executable by using the start address of the inlined function obtained from the identification of the inlined function; and replacing said inlined function with a long branch to a shared memory probe code sequence.

2. The computer-implemented method for examining an inlined function using a performance analysis tool as recited in claim 1 further comprising:
    creating a data structure which maintains location information for said inlined function and information related to said desired task for said inlined function.

3. The computer-implemented method for examining an inlined function using a performance analysis tool as recited in claim 1 further comprising:
    using said performance analysis tool to perform instrumentation on said inlined function.

4. The computer-implemented method for examining an inlined function using a performance analysis tool as recited in claim 1 further comprising:
    using said performance analysis tool to perform mapping of samples to said inlined function.

5. The computer-implemented method for examining an inlined function using a performance analysis tool as recited in claim 1 wherein said performance analysis tool is comprised of an instrumentation application.

6. The computer-implemented method for examining an inlined function using a performance analysis tool as recited in claim 1 wherein said performance analysis tool is comprised of a sampling application.

7. A computer-storage medium embodying instructions that cause a computer to perform a method for examining an inlined function using a performance analysis tool, said method comprising:
    identifying an inlined function in source code by using source correlation information contained within a binary executable of the source code, wherein said source code is processed for the binary executable;
    inserting a breakpoint at the start of said inlined function in said binary executable by using the start address of the inlined function obtained from the identification of the inlined function; and
    replacing said inlined function with a long branch to a shared memory probe code sequence.

8. The computer-storage medium of claim 7 further comprising instructions that cause said computer to perform said method further comprising:
    creating a data structure which maintains location information for said inlined function and information related to said desired task for said inlined function.

9. The computer-storage medium of claim 7 further comprising:
    using said performance analysis tool to perform instrumentation on said inlined function.

10. The computer-storage medium of claim 7 further comprising:
    using said performance analysis tool to perform mapping of samples to said inlined function.

11. The computer-storage medium of claim 7 wherein said performance analysis tool is comprised of an instrumentation application.

12. The computer-storage medium of claim 7 wherein said performance analysis tool is comprised of a sampling application.

13. An apparatus having a processor for examining an inlined function using a performance analysis tool, said apparatus comprising:
    means for identifying an inlined function in source code by using source correlation information contained within a binary executable of the source code, wherein said source code is processed for the binary executable;
    means for inserting a breakpoint at the start of said inlined function in said binary executable by using the start address of the inlined function obtained from the identification of the inlined function; and
    means for replacing said inlined function with a long branch to a shared memory probe code sequence.

14. The apparatus of claim 13 further comprising:
    means for creating a data structure which maintains location information for said inlined function and information related to said desired task for said inlined function.

15. The apparatus of claim 13 further comprising means for performing instrumentation on said inlined function.

16. The apparatus of claim 13 further comprising means to perform mapping of samples to said inlined function.

17. The apparatus of claim 13 wherein said performance analysis tool is comprised of an instrumentation application.

18. The apparatus of claim 13 wherein said performance analysis tool is comprised of a sampling application.

19. The computer-implemented method for examining an inlined function using a performance analysis tool as recited in claim 1 wherein said shared memory probe code sequence saves registers, executes the original bundle of said inlined function, restores said registers, and jumps back to said computer code.

20. The computer-implemented method for examining an inlined function using a performance analysis tool as recited in claim 1 wherein said inserting further comprises:
    reading source correlation information from within said binary executable; and
    obtaining start and end addresses for said inlined function using said source correlation information.

21. The computer-storage medium of claim 7 wherein said shared memory probe code sequence saves registers, executes the original bundle of said inlined function restores said registers, and jumps back to said computer code.

22. The computer-storage medium of claim 7 wherein said inserting further comprises:
    reading source correlation information from within said binary executable code; and
    obtaining start and end addresses for said in lined function using said source correlation information.

23. The apparatus of claim 13 wherein said shared memory probe code sequence saves registers, executes the original bundle of said inlined function, restores said registers, and jumps back to said computer code.

24. The apparatus of claim 13 further comprising:
    means for reading source correlation information from within said binary executable code; and
    means for obtaining start and end addresses for said inlined function using said source correlation information.

* * * * *

UNITED STATES PATENT AND TRADEMARK OFFICE
CERTIFICATE OF CORRECTION

PATENT NO. : 7,360,207 B2
APPLICATION NO. : 10/016949
DATED : April 15, 2008
INVENTOR(S) : Brian Fahs et al.

It is certified that error appears in the above-identified patent and that said Letters Patent is hereby corrected as shown below:

On the Title page, in field (57), under "Abstract", in column 2, line 6, after "perform" insert -- a --.

In column 6, line 61, in Claim 1, after "for" insert -- the --.

In column 8, line 41, in Claim 21, after "function" insert -- , --.

Signed and Sealed this

Twenty-ninth Day of July, 2008

JON W. DUDAS
*Director of the United States Patent and Trademark Office*